(12) United States Patent
Kubo

(10) Patent No.: US 12,184,822 B2
(45) Date of Patent: Dec. 31, 2024

(54) ELECTRICAL EQUIPMENT

(71) Applicant: SHARP KABUSHIKI KAISHA, Sakai (JP)

(72) Inventor: Takashi Kubo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/211,618

(22) Filed: Jun. 20, 2023

(65) Prior Publication Data

US 2024/0064254 A1 Feb. 22, 2024

(30) Foreign Application Priority Data

Aug. 19, 2022 (JP) ................. 2022-130891

(51) Int. Cl.
*H04N 1/23* (2006.01)
*G03G 15/00* (2006.01)
*H04N 1/00* (2006.01)

(52) U.S. Cl.
CPC ....... *H04N 1/2392* (2013.01); *G03G 15/5004* (2013.01); *G03G 15/55* (2013.01); *G03G 15/80* (2013.01); *H04N 1/00891* (2013.01); *H04N 1/00901* (2013.01); *H04N 1/00986* (2013.01)

(58) Field of Classification Search
CPC .... G03G 15/5004; G03G 15/55; G03G 15/80; H04N 1/2392; H04N 1/00891; H04N 1/00901; H04N 1/00986
See application file for complete search history.

(56) References Cited

U.S. PATENT DOCUMENTS

| | | | |
|---|---|---|---|
| 2010/0070794 A1* | 3/2010 | Park ....................... | G03G 15/55 709/204 |
| 2010/0303478 A1* | 12/2010 | Nakajima .............. | G03G 15/55 399/113 |
| 2015/0168899 A1* | 6/2015 | Suwabe ................. | G03G 15/80 399/9 |
| 2020/0379393 A1* | 12/2020 | Nakazawa ......... | G03G 15/5004 |

FOREIGN PATENT DOCUMENTS

JP H06-236127 A 8/1994

* cited by examiner

*Primary Examiner* — Sandra Brase
(74) *Attorney, Agent, or Firm* — ScienBiziP, P.C.

(57) ABSTRACT

According to a multifunction peripheral according to the present disclosure, when a DC mixing detection circuit detects that electric source power contains DC power, a DC detection signal Sdc is output from the DC mixing detection circuit. This DC detection signal Sdc is input to a solenoid of a shutoff mechanism. In response, the solenoid turns off a mechanical switch via a movable member. In addition, the DC detection signal Sdc is input to a CPU. In response, the CPU displays an error message on a display and outputs a warning sound from a speaker.

8 Claims, 14 Drawing Sheets

ELECTRICAL EQUIPMENT

BACKGROUND OF THE INVENTION

Field of the Invention

The present disclosure relates to electrical equipment, and in particular, to electrical equipment that uses alternating current (AC) power as electric source power.

Description of the Background Art

An example of this type of electrical equipment is an electrophotographic image forming apparatus. In an electrophotographic image forming apparatus, a toner image is formed on an image recording medium such as paper, and heat is applied to this toner image to fix same to the image recording medium. Accordingly, a fixing device with a heater is provided. Some fixing devices have a configuration in which AC power as electric source power is directly input to the heater (especially without being converted to direct current (DC) power). In this configuration, an on/off operator is provided to turn on/off the AC power input to the heater.

For example, it is conventionally known that a triac and relay are installed in series with the heater of a fixing device (thermal fixer) as an on/off operator. According to this configuration, the heating temperature of the heater is controlled by turning the triac on/off as appropriate. Further, when the temperature of the heater rises abnormally, the relay is turned off to prevent abnormal overheating of the heater.

AC power as electric source power is obtained, for example, from a commercial power source, but the electric source power may be obtained from a photovoltaic power generation system. However, when the electric source power is obtained from a photovoltaic power generation system that employs a transformerless power conditioner, DC power may appear in the electric source power if the power conditioner fails. This would be inconvenient for electrical equipment that uses AC power as electric source power. For example, in the aforementioned conventional configuration, the triac is no longer turned off, which may cause the AC power to continue to be input to the heater, resulting in abnormal overheating of the heater. In addition, the contacts of the relay are welded together by arcing, which prevents the relay from being turned off, and as a result, abnormal overheating of the heater cannot be prevented.

Meanwhile, there may be elements that can operate normally, so to speak, operable elements, even if the electric source power contains DC power. For such operable elements, it is beneficial from the perspective of ensuring the operability (availability) of the entire electrical equipment to maintain the electric source power, i.e., to allow them to continue to operate.

However, it is not desirable to leave a kind of abnormal condition where the electric source power contains DC power. If such an abnormal condition occurs, it is desirable that the user be informed.

Accordingly, it is an object of the present disclosure to provide novel electrical equipment that can avoid inconveniences caused by the presence of DC power in the electric source power and allow operable elements capable of operating normally to continue to operate, thereby ensuring the operability of the entire electrical equipment, and can further prevent an abnormal condition where the electric source power contains DC power from being left unattended, by informing the user that the electric source power contains DC power.

SUMMARY OF THE INVENTION

To achieve this object, the present disclosure is electric electrical equipment that uses AC power as electric source power, and includes a detector, a shutter, and an information outputter. The detector detects whether the electric source power contains DC power. The shutter shuts off supply of the electric source power to a least a specific element when the detector detects that the electric source power contains DC power. The specific element is an element that is inconvenient if the electric source power includes DC power. Further, the information outputter outputs predetermined information when the detector detects that the electric source power contains DC power. This predetermined information is information related to a fact that the electric source power contains DC power. On top of that, the direct or indirect supply of electric source power to the operable elements, strictly speaking, to some or all of the operable elements, is maintained. Here, the operable elements are elements that can operate normally even if the electric source power contains DC power. Further, the indirect supply of power is, for example, supply of power after the electric source power, which is, for example, AC power, is converted into DC power. The information outputter is included in the operable elements, strictly speaking, those operable elements to which the direct or indirect supply of electric source power is maintained.

The specific element in the present disclosure includes, for example, a heater.

Further, the electrical equipment according to the present disclosure may be an electrophotographic image forming apparatus equipped with a fixing device having a heater as the specific element.

In this case, an image reader and an image outputter may be further provided. The image reader reads the image of a document. Further, the image outputter outputs an image based on the image read by the image reader, in an electronic form. These image reader and image outputter are also included in the operable elements, strictly speaking, those operable elements to which the direct or indirect supply of electric source power is maintained.

The information outputter in the present disclosure outputs predetermined information in a visual form, for example.

Further, the information outputter in the present disclosure may also output predetermined information in an audial form.

Furthermore, the information outputter in the present disclosure may also output predetermined information in an electronic form.

According to the present disclosure, it is possible to avoid inconveniences caused by the presence of DC power in the electric source power and allow operable elements capable of operating normally to continue to operate, thereby ensuring the operability of the entire electrical equipment, and to further prevent an abnormal condition where the electric source power contains DC power from being left unattended, by informing the user the electric source power contains DC power.

DESCRIPTION OF THE PREFERRED EMBODIMENTS

First Embodiment

Figure 1:
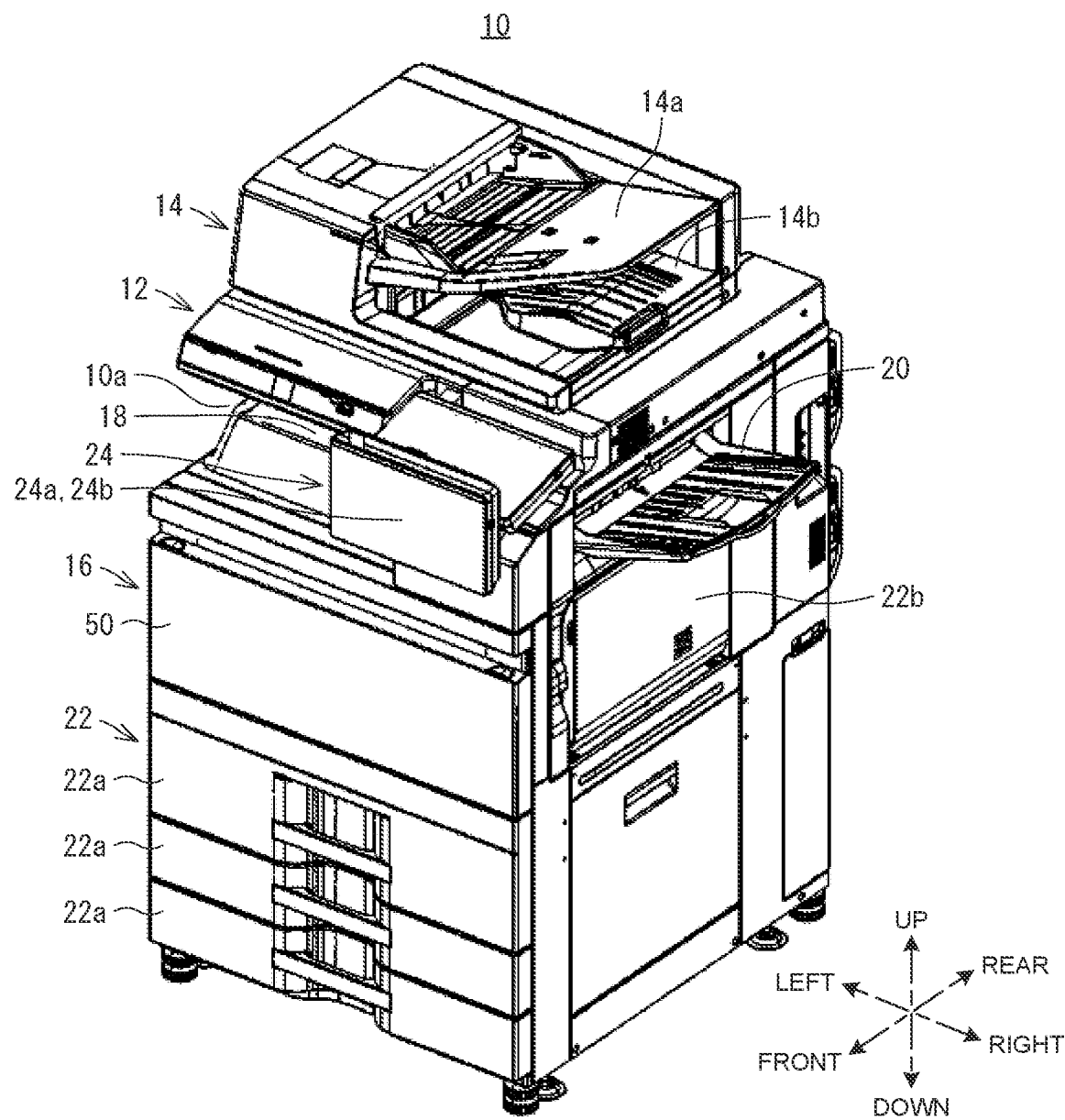
FIG. 1 is a perspective view of a multifunction peripheral according to a first embodiment of the present disclosure.
Figure 2:
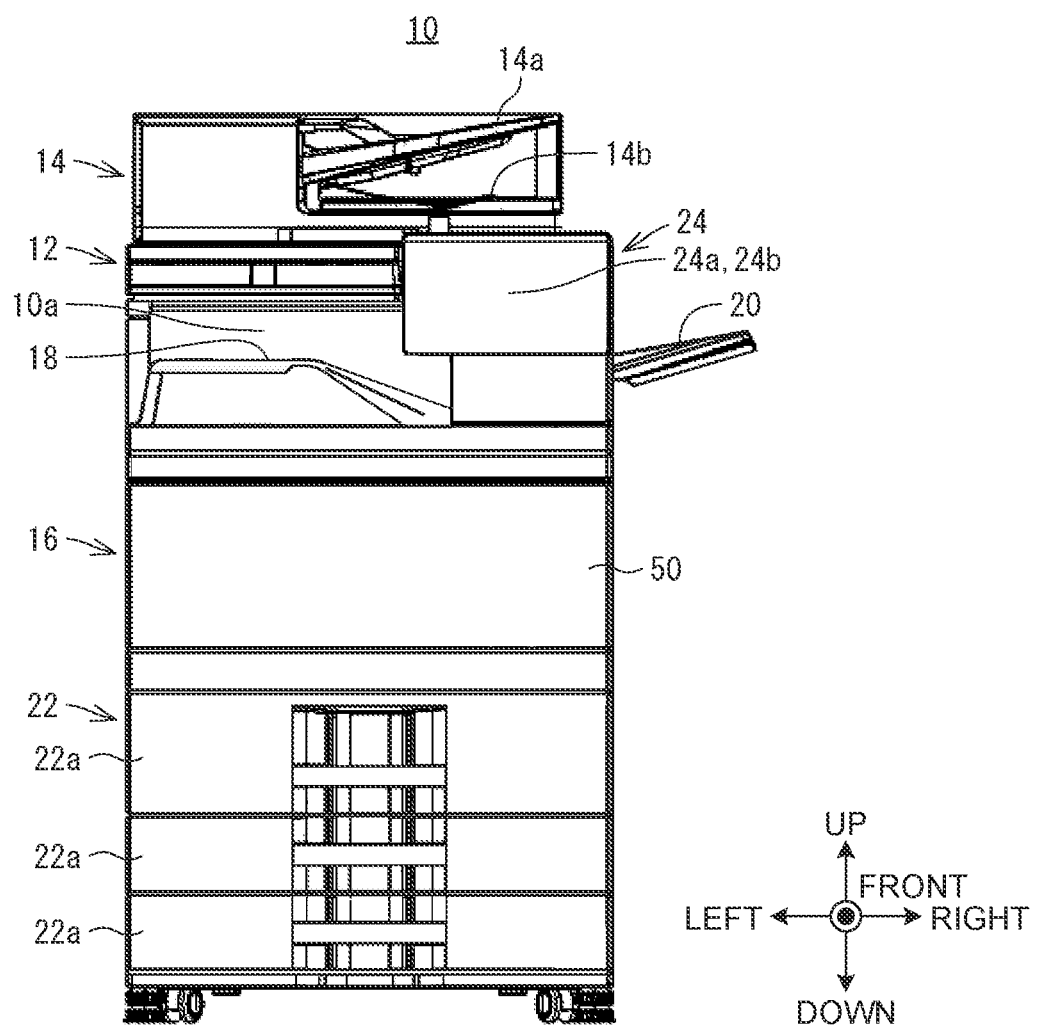
FIG. 2 is a front view of the multifunction peripheral according to the first embodiment of the present disclosure.

A first embodiment of the present disclosure will be described using a multifunction peripheral (MFP) 10 illustrated in FIGS. 1 and 2 as an example.

The multifunction peripheral 10 according to the first embodiment is a type of image forming apparatus and includes a plurality of functions such as a copy function, an image scanner function, a printer function, and a fax function. FIG. 1 is a perspective view of the multifunction peripheral 10, illustrating a front surface, an upper surface, and a left side surface of the multifunction peripheral 10 installed in a ready-for-use condition. That is, the up-down direction in FIG. 1 corresponds to the up-down direction of the multifunction peripheral 10. Further, the left diagonal downward direction in FIG. 1 corresponds to the front of the multifunction peripheral 10, and the right diagonal upward direction in FIG. 1 corresponds to the rear of the multifunction peripheral 10. Further, the left diagonal upward direction in FIG. 1 corresponds to the left of the multifunction peripheral 10, and the right diagonal downward direction in FIG. 1 corresponds to the right of the multifunction peripheral 10. FIG. 2 is a front view of the multifunction peripheral 10.

An image reader 12 as the image reader is provided at the upper part of (the main body of) the multifunction peripheral 10. This image reader 12 performs image reading processing to read an image of a document (not illustrated) and output two-dimensional read image data corresponding to the image of the document. Therefore, the image reader 12 has a document table (not illustrated) on which the document is placed. This document table is formed by a transparent member such as substantially rectangular flat glass, and is provided with its both main surfaces arranged along the horizontal direction. The upper surface of the both main surfaces of the document table is the surface on which the document is placed. In addition, provided below the document table are an image reading unit (not illustrated) having a light source, a mirror, a lens, a line sensor, and the like and appropriate elements including a drive mechanism (not illustrated) for moving (scanning) an image reading position (not illustrated) along the lower surface of the document table by the image reading unit. That is, in a state where a document is placed on the document table, the image of the document is read by moving the image reading position by the image reading unit by the drive mechanism, and the image of the document is read by a so-called fixed reading method. In addition, provided above the document table is an automatic document feeder (ADF) 14 which also serves as a document pressing cover for pressing the document placed on the document table.

The automatic document feeder 14 is provided so as to be able to transition between a state (opened state) where the upper surface of the document table (document placement surface) is exposed to the outside and a state (closed state) where the upper surface of the document table is covered. Therefore, the automatic document feeder 14 is coupled to the main body (housing) of the multifunction peripheral 10 via a suitable fulcrum support member such as a hinge (not illustrated). In FIGS. 1 and 2, the automatic document feeder 14 is in the closed state. Further, the automatic document feeder 14 functions as it should when being in the closed state.

That is, the automatic document feeder 14 has a document placement tray 14a. On this document placement tray 14a, a document, strictly speaking, a sheet-like document, can be placed, and in particular, a plurality of documents can be placed in a stacked manner. Further, the automatic document feeder 14 automatically takes in the document placed on the document placement tray 14a in units of one sheet into the automatic document feeder 14. The document taken inside the automatic document feeder 14 is fed to the upper surface of the document table, and particularly, to the image reading position by the image reading unit described above. As a result, the image of the document is read in a so-called skimming through method. After that, the document is discharged into a document discharge tray 14b of the automatic document feeder 14.

Below the image reader 12, an image former 16 as an image former is provided across an outwardly opened intra-body space 10a. This image former 16 is responsible for image forming processing that forms, on a sheet-like image recording medium (not illustrated), for example, a paper, an image that is based on appropriate image data such as the read image data described above. This image forming processing is executed by a known electrophotographic method. Therefore, the image former 16 includes a photoreceptor drum, a charging device, an exposure device, a developing device, a transferring device, a cleaning device, and a static elimination device, which are not illustrated. In addition, the image former 16 includes a fixing device 16a (see FIG. 3), which is described below. After the image forming processing by this image former 16, the paper, so to speak, a printed material is discharged to the intra-body space 10a, or strictly speaking, to a paper discharge tray 18 provided in the intra-body space 10a. Apart from the paper discharge tray 18 provided in the intra-body space 10a, an extra-body paper discharge tray 20 is provided on the outside of, particularly on the right side of the multifunction peripheral 10. When this extra-body paper discharge tray 20 is set as the paper discharge destination, the printed material is discharged to the extra-body paper discharge tray 20.

Further, a paper feeder 22 as the paper feeder is provided below the image former 16, in other words, at the lower part of the multifunction peripheral 10. The paper feeder 22 has one or more, for example, three paper feed cassettes 22a, 22a, . . . . In each paper feed cassette 22a, 22a, . . . appropriately sized sheets of paper are contained. For instance, sheets of paper differently sized from one another are contained in the paper feed cassettes 22a, respectively. Further, a manual feed tray 22b, which is an auxiliary paper feed tray, is provided at an appropriate position of the multifunction peripheral 10, for example, on the right side surface of the multifunction peripheral 10 as illustrated in FIG. 1. The manual feed tray 22b illustrated in FIG. 1 is closed. This manual feed tray 22b can transition between closed and opened states, and is usable when in the opened state. Further, the paper feeder 22 uses either one of the respective paper feed cassettes 22a, 22a, . . . and the manual feed tray 20b as a paper feed source, and supplies a paper from the paper feed source to the image former 16 in units of one sheet.

Moreover, an operation unit 24 in the shape of a substantially rectangular plate is provided at the front part of the main body of the multifunction peripheral 10, in the upper part of the multifunction peripheral 10. This operation unit 24 is coupled to the main body of the multifunction peripheral 10 with its one main surface facing outward. One main surface of the operation unit 24 is an operation surface, and a display 24b with a touch panel 24a is provided on this operation surface. Further, the angle (orientation) of the operation surface of the operation unit 24 with respect to the horizontal direction can be changed within a predetermined range, i.e., the operation unit 24 is installed in that manner.

The display 24b with the touch panel 24a is a component in which the display 24b having a rectangular-shaped display surface and the sheet-shaped touch panel 24a provided to overlap on the display surface of the display 24b are integrally assembled. The touch panel 24a is an operation acceptor capable of accepting a touch operation by a user (not illustrated) using the multifunction peripheral 10, and is, for example, a projection capacitive panel. Further, the display 24b is a displayer that displays various screens on a display surface, and is, for example, a liquid crystal display (LCD). The touch panel 24a is not limited to a projection capacitive panel, but may be another type of panel such as a capacitive type of a surface type, an electromagnetic induction type, a resistance film type, and an infrared type. Further, the display 24b is not limited to a liquid crystal display but may be an organic electroluminescence (EL) display.

The user usually stands in front of the multifunction peripheral 10 to use the multifunction peripheral 10 and to operate, among other things, the operation unit 24. In order to improve the operability and visibility of the operation surface of the operation unit 24 by the user at that time, the angle of the operation surface with respect to the horizontal direction can be changed as described above. Further, in addition to the touch panel 24a, the operation unit 24 has an appropriate hardware switch, such as push-button switch (not illustrated). Moreover, in addition to the display 24b, the operation unit 24 also has an appropriate light emitter such as a light emitting diode (LED) (not illustrated).

Figure 3:
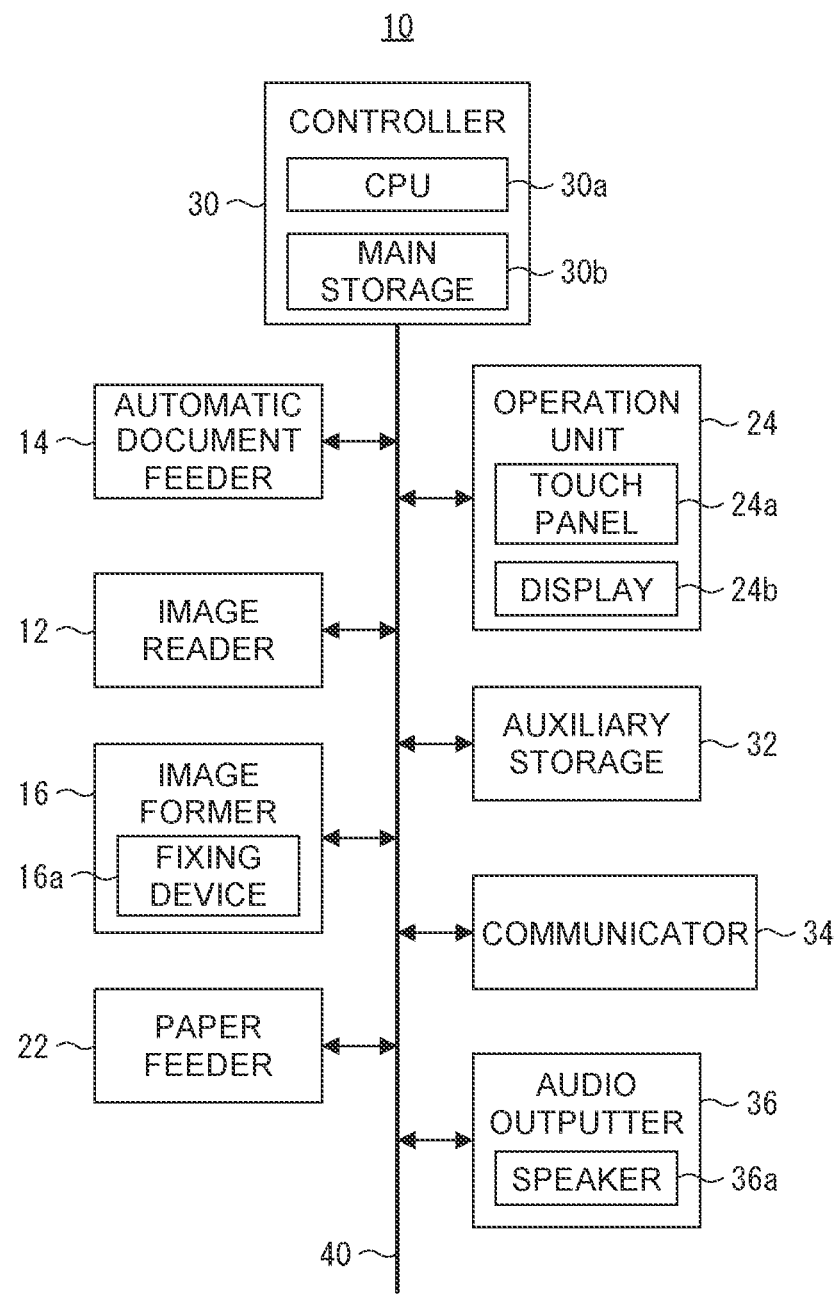
FIG. 3 is a block diagram illustrating an electrical configuration of the multifunction peripheral according to the first embodiment.

FIG. 3 is a block diagram illustrating an electrical configuration of the multifunction peripheral 10. As illustrated in FIG. 3, in addition to the image reader 12, automatic document feeder 14, image former 16, paper feeder 22, and operation unit 24, the multifunction peripheral 10 includes the controller 30, an auxiliary storage 32, a communicator 34, and an audio outputter 36. These are connected to one another through a common bus 40. The image reader 12, automatic document feeder 14, image former 16, paper feeder 22 and operation unit 24 are as described above. In particular, the image former 16 is equipped with a fixing device 16a. Further, in FIG. 3, elements not directly related to the main purpose of the present disclosure are omitted.

The controller 30 is a controller, which takes charge of overall control of the multifunction peripheral 10. Therefore, the controller 30 has a computer, such as a central processing unit (CPU) 30a, as a control executor. In addition, the controller 30 has a main storage 30b as a main storage directly accessible by the CPU 30a. The main storage 30b includes a read only memory (ROM) and a random access memory (RAM) which are not illustrated. The ROM stores a control program (firmware) for controlling the operation of the CPU 30a. Further, the RAM constitutes a work area and a buffer area which are used when the CPU 30a executes processing based on the control program.

The auxiliary storage 32 is an auxiliary storage that stores various data such as the aforementioned read image data. This auxiliary storage 32 has, for example, a hard disk drive (not illustrated). Further, the auxiliary storage 32 may have a rewritable non-volatile memory such as a flash memory.

The communicator 34 is a communicator that is responsible for two-way communication processing via a local area network (LAN) line (not illustrated). Further, the communicator 34 is also responsible for two-way communication processing via a public switched telephone network (not illustrated). The communicator 34 is connected to the LAN line by wire, for example, but may be connected to the LAN line wirelessly by, for example, Wi-Fi (registered trademark). A personal computer (hereinafter referred to as "PC") as an external device (not illustrated) is connected to the LAN line, and particularly, a plurality of PCs are connected. In addition, the LAN line is connected to an external line via a router (not illustrated), for example, to the Internet.

The audio outputter 36 has a speaker 36a. The speaker 36a is installed at an appropriate location on the multifunction peripheral 10, for example, discreetly on the right or left side surface of the multifunction peripheral 10.

The multifunction peripheral 10 according to the first embodiment operates with AC power as electric source power. The AC power here is obtained, for example, from a commercial power source.

A main power switch 100 (see FIG. 4) for turning on/off the reception of AC power input as the electric source power is installed at an appropriate position of the multifunction peripheral 10, for example, at a position covered by the front cover 50, i.e., not visible from outside the multifunction peripheral 10. The front cover 50 is provided to cover the image former 16, and particularly, the front cover 50 is provided so as to be able to transition between a state where a portion of the image former 16 is covered (closed state) and a state where a portion of the image former 16 is exposed to the outside (opened state).

That is, when the front cover 50 is opened, the main power switch 100 is exposed to the outside, and the main power switch 100 can accept manual operation. Further, when the main power switch 100 is turned on, AC power as the electric source power is input to the multifunction peripheral 10, and the multifunction peripheral 10 becomes operational. Strictly speaking, the multifunction peripheral 10 becomes operational when the main power switch 100 is turned on and the front cover 50 is closed. In other words, even if the main power switch 100 is on, the multifunction peripheral 10 will not operate when the front cover 50 is open. The main power switch 100 is, for example, a 2-pole single throw seesaw switch (rocker switch).

As mentioned above, AC power as the electric source power for the multifunction peripheral 10 is obtained, for example, from a commercial power source, but may alternatively be obtained from a photovoltaic power generation system (not illustrated). However, when the electric source power is obtained from a photovoltaic power generation system that employs a transformerless power conditioner, DC power may appear in the electric source power if the power conditioner fails. This would be inconvenient for the multifunction peripheral 10, which operates with AC power as electric source power.

In particular, the fixing device 16a has a heater 162 as described below, and AC power as the electric source power is directly input to this heater 162. In addition, a triac 164 and a thermostat 166 are provided in series with the heater 162 as on/off operator to turn on/off the AC power input to the heater 162 as appropriate. If DC power is input to such AC loads as heater 162, triac 164, and thermostat 166, the heater 162 may be abnormally overheated, which in turn may damage the multifunction peripheral 10 including such AC loads. That is, when DC power is input to the triac 164, the triac 164 is not turned off. Further, when DC power is input to the thermostat 166, the contacts of the thermostat 166 are welded by arc discharge, and the contacts remain on. As a result, the electric source power including DC power continues to be input to the heater 162, causing the heater 162 to abnormally overheat, which in turn may damage the multifunction peripheral 10 including the AC loads.

To avoid this inconvenience, in the first embodiment, when the electric source power includes DC power, the supply of the power to the AC loads is shut off. Meanwhile, for operable elements that can operate normally even if the electric source power contains DC power, the direct or indirect supply of electric source power is maintained (i.e., after being converted to DC power (DC voltage V1, V2, . . . described in detail below)) and the operable elements are allowed to continue to operate. Furthermore, an error message 500 described below is displayed on the display 24b to inform the outside world that the electric source power contains DC power, which is a kind of abnormal condition. In addition, a warning sound is output from the speaker 36a as described below.

Figure 4:
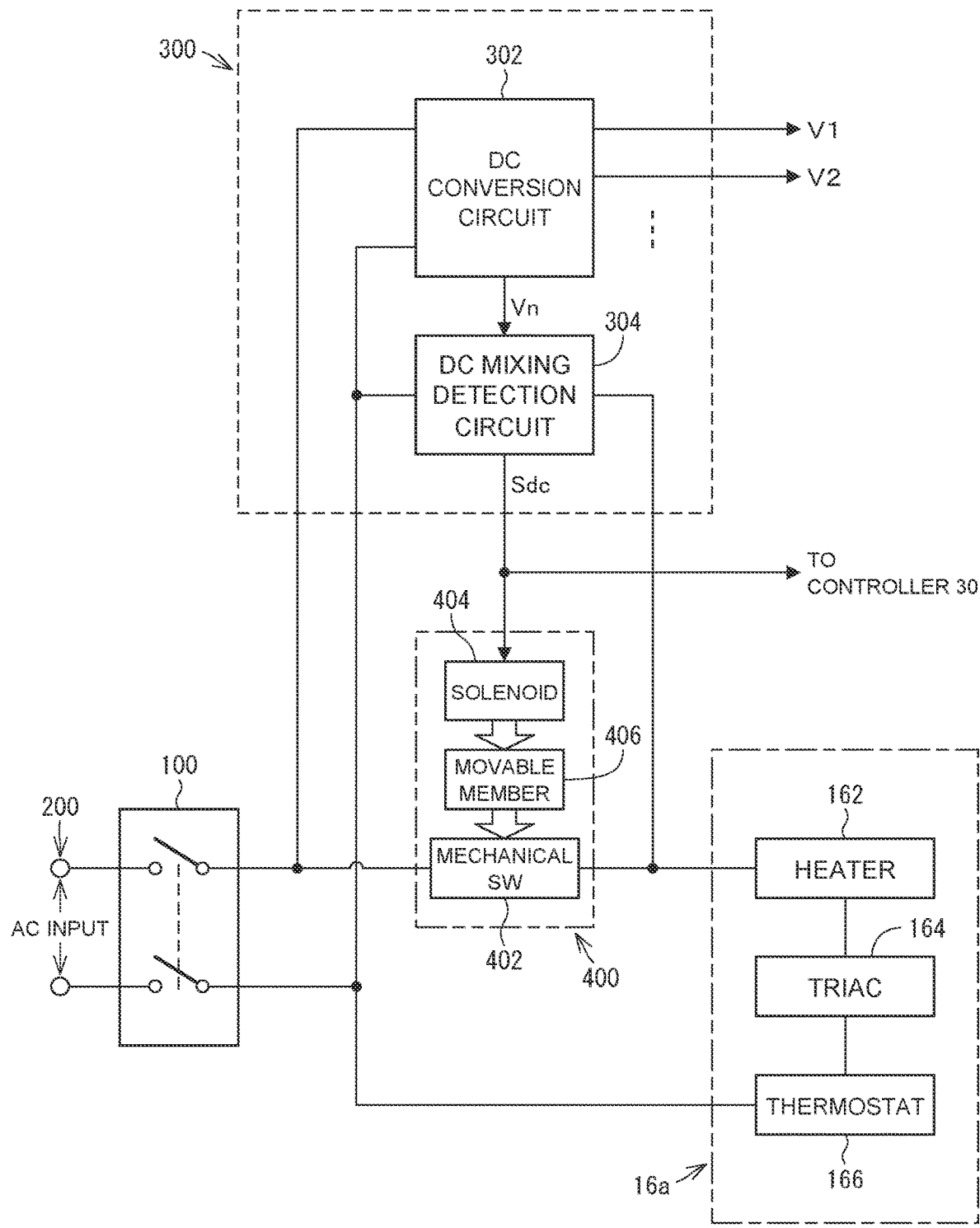
FIG. 4 is an electrical circuit diagram of a part of the multifunction peripheral according to the first embodiment, including a shutoff mechanism.

Specifically, as illustrated in FIG. 4, the multifunction peripheral 10 has an alternating current (AC) input terminal (receptacle) 200, which is the inputter for AC power as the electric source power. This AC input terminal 200 is connected to the power supply circuit 300 via the main power switch 100, and particularly to a direct current (DC) conversion circuit 302. The DC conversion circuit 302 converts AC power input via the main power switch 100 into DC power and further generates a plurality of DC voltages V1, V2, . . . of various voltage values. These DC voltages V1, V2, . . . are input to each DC load as the source voltage of each DC load. The DC load here is any electrical element other than the AC loads. For example, the image reader 12, automatic document feeder 14, paper feeder 22, operation unit 24, controller 30, auxiliary storage 32, communicator 34, and audio outputter 36 are all DC loads.

Further, the power supply circuit 300 has a DC mixing detection circuit 304. This DC mixing detection circuit 304 also receives electric source power input via the main power switch 100, and strictly speaking, the electric source power is input via the main power switch 100 and a mechanical switch (SW) 402 of a shutoff mechanism 400, which is described below. The DC mixing detection circuit 304 detects whether the electric source power contains DC power, and outputs a DC detection signal Sdc when detecting that the electric source power contains DC power.

Although the detailed description including illustrations is omitted, the DC mixing detection circuit 304 has, for example, a current sensor using a Hall element. The current sensor detects the direction and magnitude of the current component (i.e., current) of the electric source power. On the basis of the detection results from this current sensor, the DC mixing detection circuit 304 determines whether the electric source power contains DC power, i.e., detects same. Further, the DC mixing detection circuit 304 operates using a DC voltage Vn of an appropriate voltage value given by the DC conversion circuit 302 as the source voltage.

The DC detection signal Sdc output from the DC mixing detection circuit 304 is input to a solenoid 404 of the shutoff mechanism 400 described below. In addition, the DC detection signal Sdc is input to the controller 30, strictly speaking, to the controller 30 through an interface circuit (not illustrated), and more strictly speaking, to the CPU 30a.

In addition, the AC input terminal 200 is connected to the series circuit of the heater 162, triac 164, and thermostat 166 of the fixing device 16a via the main power switch 100 and the mechanical switch 402 of the shutoff mechanism 400. The heater 162 is a heater for heating a heating roller (not illustrated) of the fixing device 16a. AC power as the electric source power is input to this heater 162 through a triac 164 and a thermostat 166. The triac 164 turns on/off in accordance with commands from the CPU 30a, which controls the heating temperature of the heater 162. Further, the thermostat 166 turns on when the temperature of heater 162 is below a predetermined threshold and turns off when the temperature of heater 162 exceeds the predetermined threshold, thereby preventing abnormal overheating of the heater 162.

The shutoff mechanism 400 has the mechanical switch 402, solenoid 404, and a movable member 406. The mechanical switch 402 is, for example, a single-pole, single-throw seesaw switch, which is provided to turn on/off between one pole of the main power switch 100 and one end of the heater 162. This mechanical switch 402 is in an ON state in normal times when the electric source power does not contain DC power. The DC detection signal Sdc is then input to the solenoid 404 as described above. When the DC detection signal Sdc is input, that is, when DC power appears in the electric source power, the solenoid 404 forces the mechanical switch 402 off via the movable member 406.

Figure 5:
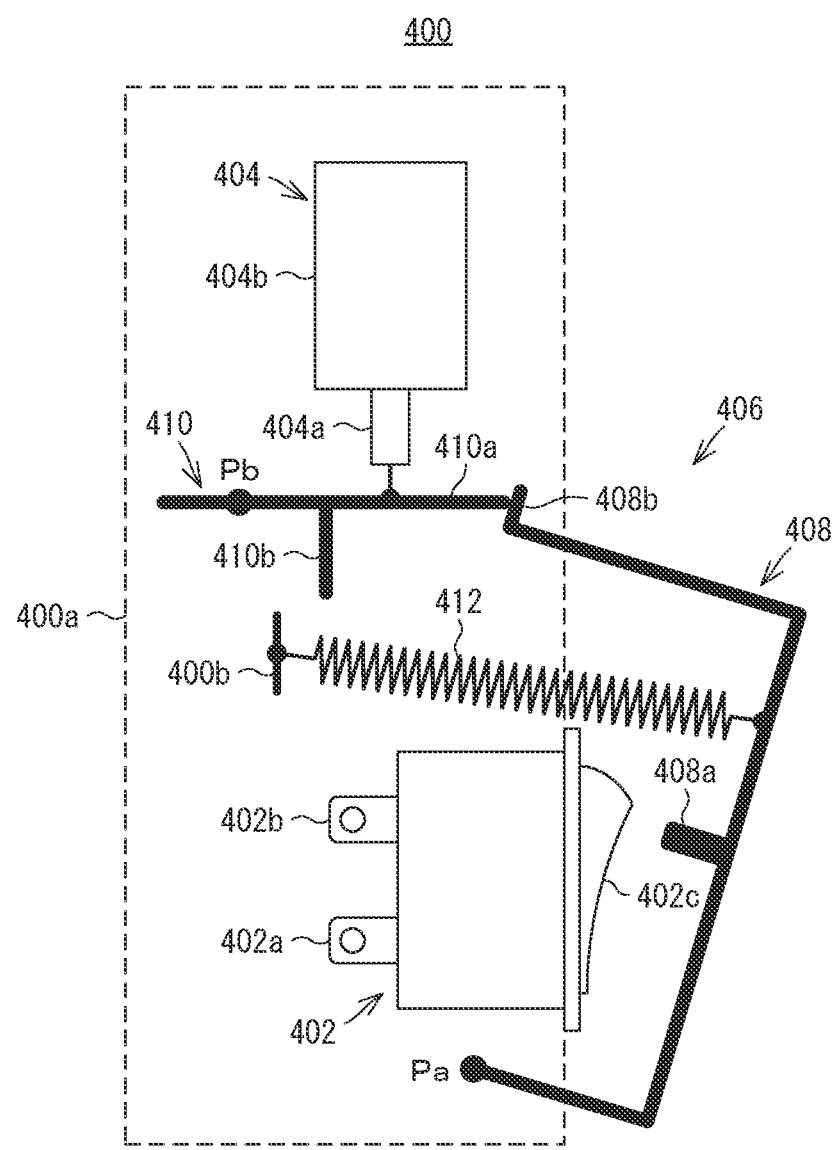
FIG. 5 is a diagram schematically illustrating a state of the shutoff mechanism in the first embodiment.

In more detail, FIG. 5 is a diagram schematically illustrating the state of the shutoff mechanism 400 in normal times. As illustrated in this FIG. 5, the mechanical switch 402 is fixed to a housing 400a of the shutoff mechanism 400. The mechanical switch 402 in normal times is in the OFF state as described above, i.e., an input side terminal 402a and an output side terminal 402b of the mechanical switch 402 are connected to each other.

The solenoid 404 is a push type and is fixed to the housing 400a of the shutoff mechanism 400, with a plunger 404a pointing downward, above the mechanical switch 402. The plunger 404a is then coupled to the holding member 410 of the movable member 406 as described below.

The movable member 406 has a pushing member 408, a holding member 410, and a biasing member 412. The pushing member 408 has a pushing section 408a protruding toward the operation button 402c of the mechanical switch 402, and is rotatably mounted to the housing 400a of the shutoff mechanism 400, with the portion below the pushing section 408a as a support point Pa. Further, a portion of the pushing member 408 above the pushing section 408a is provided with a contacted section 408b that contacts the tip of a holding section 410a of the holding member 410. Furthermore, the pushing member 408 is biased toward the operation button 402c of the mechanical switch 402 by a pull spring as the biasing member 412.

The holding member 410 has the holding section 410a that contacts the pushing section 408a of the pushing member 408 as described above. In addition, the holding member 410 has a stopper section 410b that forms a right angle to the holding section 410a. This holding member 410 is rotatably mounted, below the solenoid 404, to the housing 400a of the shutoff mechanism 400, with its appropriate portion as a support point Pb. Further, the holding section 410a of the holding member 410 is coupled to the plunger 404a of the solenoid 404.

The biasing member 412 is a pull spring, as described above, and biases the pushing member 408 toward the operation button 402c of the mechanical switch 402. To this end, one end of the biasing member 412 is engaged with the pushing member 408. Further, the other end of the biasing member 412 is then engaged with a suitable engagement section 400b coupled to the housing 400a of the shutoff mechanism 400.

As illustrated in this FIG. 5, in normal times, the tip of the holding section 410a of the holding member 410 is in contact with the contacted section 408b of the pushing member 408. The pushing section 408a of the pushing member 408 is separated from the operation button 402c of the mechanical switch 402.

Figure 6:
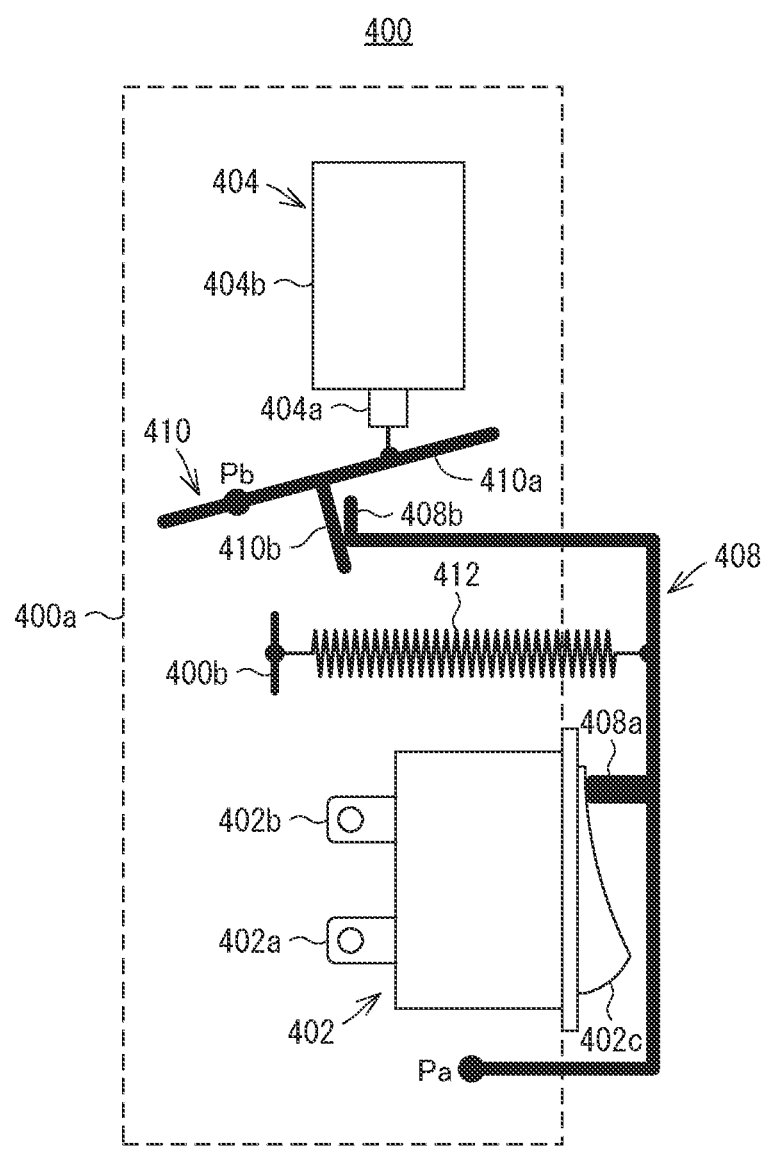
FIG. 6 is a diagram schematically illustrating another state of the shutoff mechanism in the first embodiment.

In the state illustrated in FIG. 5, when the DC detection signal Sdc is input to the solenoid 404, the solenoid 404 is driven, that is, the plunger 404a moves in the direction of being housed in a main body 404b of the solenoid 404. Consequently, as illustrated in FIG. 6, the holding section 410a of the holding member 410 is raised upward about the support point Pb, thereby releasing the state of contact between the tip of the holding section 410a and the contacted section 408b of the pushing member 408. The pushing member 408 is then pulled toward the operation button 402c of the mechanical switch 402 about the support point Pa by the biasing force of the biasing member 412. As a result, the operation button 402c of the mechanical switch 402 is pushed down by the pushing section 408a of the pushing member 408, and the mechanical switch 402 is turned off, that is, the input side terminal 402a and output side terminal 402b of the mechanical switch 402 are unconnected to each other. Further, (part of) the contacted section 408b of the pushing member 408 comes into contact with the stopper section 410b of the holding member 410, thereby preventing further rotation (displacement) of the pushing member 408.

The restoration from the state illustrated in FIG. 6 to the state illustrated in FIG. 5 is performed, for example, by a serviceman. In other words, the user of the multifunction peripheral 10 cannot recover from the state illustrated in FIG. 6 to the state illustrated in FIG. 5. Further, this restoration work is performed after the electric source power is assumed to contain no DC power.

Figure 7:
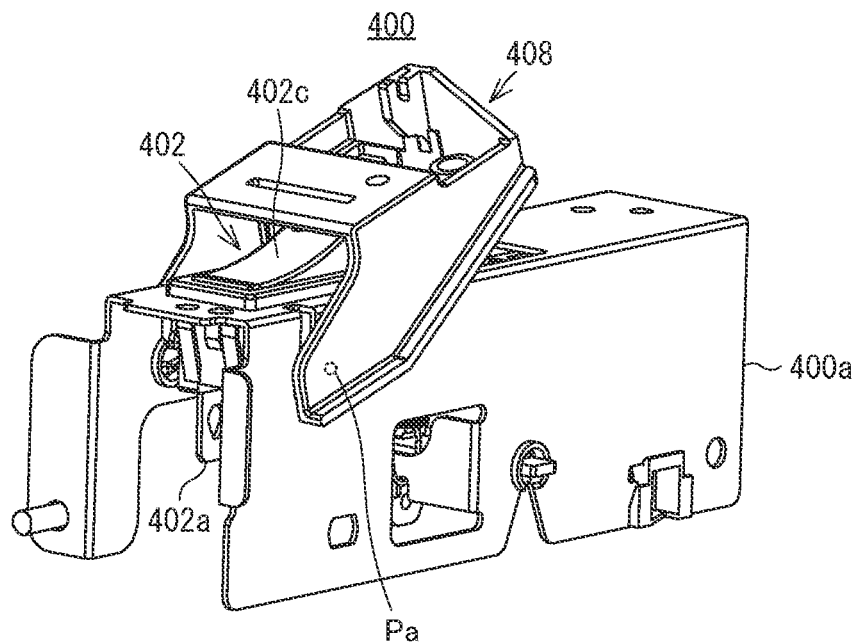
FIG. 7 is a perspective view of the shutoff mechanism in the first embodiment.

FIG. 7 is a perspective view illustrating an actual external appearance of the shutoff mechanism 400. This FIG. 7 illustrates the shutoff mechanism 400 in normal times, i.e., the shutoff mechanism 400 when the mechanical switch 402 is on. Further, in FIG. 7, for ease of viewing, the shutoff mechanism 400 is in a state of being put down sideways, so to speak.

Thus, when DC power appears in the electric source power, the supply of the electric source power to the AC loads such as the heater 162, triac 164, and thermostat 166 is shut off. This prevents damage to the multifunction peripheral 10, including AC loads, i.e., the inconvenience caused by the appearance of DC power in the electric source power is avoided.

Meanwhile, the supply of the electric source power to the DC conversion circuit 302 is maintained. The DC conversion circuit 302 operates normally even if the electric source power contains DC power, i.e., generates a plurality of DC voltages V1, V2, . . . as the source voltage for each of the DC loads mentioned above. In other words, the DC conversion circuit 302 is configured to be able to operate normally even if the electric source power contains DC power, i.e., to generate a plurality of DC voltages V1, V2, . . . as the source voltage for each of the DC loads. Therefore, each DC load can continue to operate. For example, functions that do not involve the execution of image forming processing by the image former 16, such as the image scanner function and the fax function (strictly speaking, the function to store received data in the auxiliary storage 32 among the fax reception functions and the fax transmission function), can continue to be used.

As mentioned above, the DC detection signal Sdc is also input to the CPU 30a. The CPU 30a displays an error message 500 on the display 24b such as that illustrated in FIG. 8, in response to the input of the DC detection signal Sdc.

This error message 500 includes an appropriate symbol 502 and a character string 504 indicating that an error has occurred. In addition, the error message 500 includes an appropriate character string 506 indicating that DC power, i.e., undesirable power, has been mixed into the electric source power. Furthermore, the error message 500 includes the appropriate character string 506 indicating that the supply of electric source power to the heater 162 of the fixing device 16a has been shut off, i.e., the power to the heater 162 for printing has been cut off.

Therefore, in response to the error message 500 being displayed, the user can recognize that an error has occurred in the multifunction peripheral 10, particularly, that undesirable power called DC power has been mixed into the electric source power, and that the power to the heater 162 for printing has been cut off for that reason.

As mentioned above, some functions, including the image scanner and fax functions, can continue to be used even if DC power is mixed into the electric source power. Therefore, the error message 500 is popped up at, for example, an appropriate location on the screen of the display 24b, so as not to interfere with the operation of the functions that continue to be available for use by the user. The error message 500 is then displayed continuously until a predetermined operation is performed to terminate the display of the error message 500 after a restoration work by a serviceman, for example.

In addition, the CPU 30*a* causes a predetermined warning sound to be output from the speaker 36*a*. This warning sound is continuously output until a predetermined operation is performed by the user to terminate the output of the warning sound, or until a predetermined time elapses after the warning sound is output.

Figure 9:
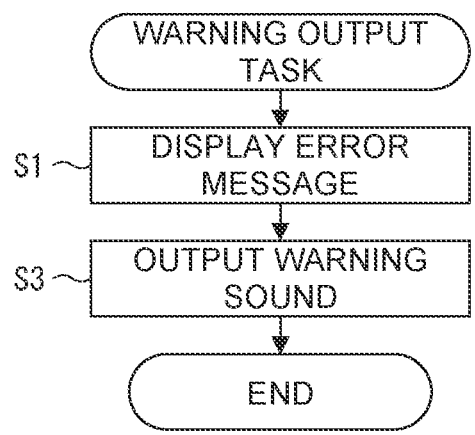
FIG. 9 is a flow diagram illustrating a flow of a warning output task in the first embodiment.

In order for the error message 500 to be displayed on the display 24*b* and the warning sound to be output from the speaker 36*a* in this way, the CPU 30*a* executes the warning output task in accordance with a warning output program included in the aforementioned control program. The flow of this warning output task is illustrated in FIG. 9. The warning output task is executed when the DC detection signal Sdc is input to the CPU 30*a*.

According to this warning output task, the CPU 30*a* first displays the error message 500 on the display 24*b* at step S1. Then, the CPU 30*a* advances the processing to step S3.

In step S3, the CPU 30*a* causes a warning sound to be output from the speaker 36*a*. With the execution of this step S3, the CPU 30*a* ends the warning output task.

As described above, according to the first embodiment, when DC power appears in the electric source power, the supply of the electric source power to the AC loads such as the heater 162, triac 164, and thermostat 166 is shut off. This prevents damage to the multifunction peripheral 10, including AC loads, i.e., the inconvenience caused by the appearance of DC power in the electric source power is avoided. Meanwhile, each DC load can continue to operate, for example, the image scanner and fax functions can continue to be used. This is extremely beneficial from the perspective of ensuring the operability of the entire multifunction peripheral 10. Furthermore, the error message 500 is displayed on the display 24*b* and a predetermined warning sound is output from the speaker 36*a*. This greatly contributes to preventing an abnormal condition where the electric source power contains DC power from being left unattended.

Note that the DC mixing detection circuit 304 in the first embodiment is an example of the detector according to the present disclosure. Further, the AC loads in the first embodiment such as the heater 162, triac 164, and thermostat 166, are examples of the specific element according to the present disclosure. Moreover, the shutoff mechanism 400 in the first embodiment is an example of the shutter according to the present disclosure. Furthermore, the error message 500 in the first embodiment is an example of the predetermined information according to the present disclosure, and is an example of predetermined information that is output in a visual form, among others. This error message 500 is displayed on the display 24*b* by the CPU 30*a* executing step S1 of the warning output task, and the CPU 30*a* executing the step S1 cooperates with the display 24*b* to constitute an example of the information outputter according to the present disclosure. In addition, the warning sound in the first embodiment is also an example of the predetermined information according to the present disclosure, and, particularly, an example of predetermined information that is output in an audial form. This warning sound is output from the speaker 36*a* by the CPU 30*a* executing step S3 of the warning output task, and the CPU 30*a* executing the step S3 cooperates with the speaker 36*a* to constitute an example of the information outputter according to the present disclosure. Furthermore, each DC load in the first embodiment is an example of the operable elements according to the present disclosure.

Although a detailed description including illustrations is omitted, in the image scanner function in the first embodiment, the aforementioned read image data may be transmitted to an external device such as the aforementioned PC via the communicator 34, i.e., in an electronic form. Further, in the fax function in this first embodiment, especially in the fax transmission function, the read image data is transmitted to the other device via the communicator 34, i.e., in an electronic form. In doing so, the communicator 34 is controlled by the CPU 30*a*, and the CPU 30*a* controlling the communicator 34 cooperates with the communicator 34 to constitute an example of the image outputter according to the present disclosure.

Figure 8:
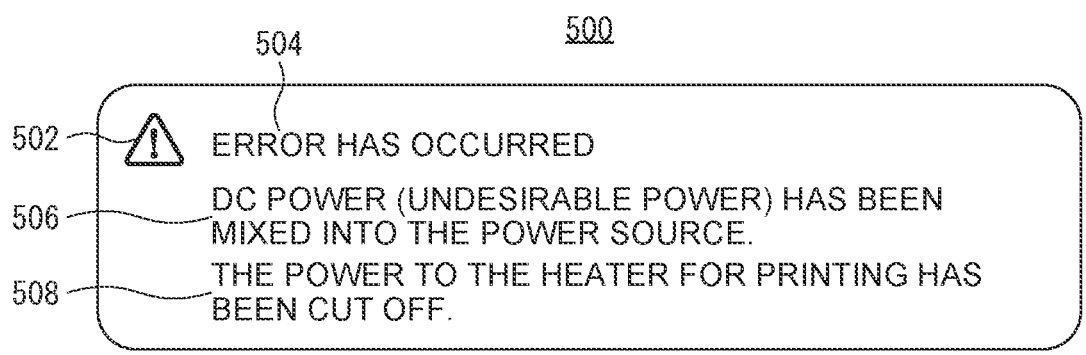
FIG. 8 is a diagram illustrating an error message in the first embodiment.
Figure 10:
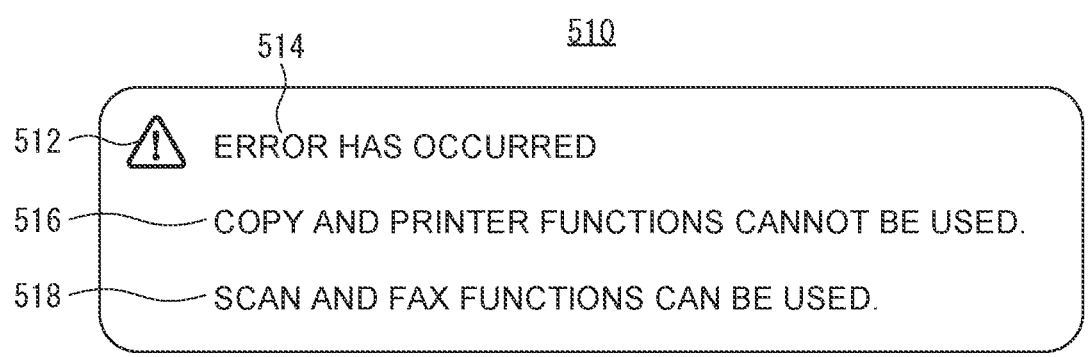
FIG. 10 is a diagram illustrating another example of the error message in the first embodiment.

Instead of or in addition to the error message 500 illustrated in FIG. 8, a second error message 510, so to speak, such as that illustrated in FIG. 10, may be displayed. In this second error message 510, a symbol 512 and a character string 514 similar to the symbol 502 and character string 504 in the first error message 500, so to speak, illustrated in FIG. 8, are included. In addition, the second error message 510 includes an appropriate character string 516 indicating that the copy and fax functions, that is, the functions that involve the execution of the image forming processing by the image former 16, cannot be used. Furthermore, the second error message 510 includes an appropriate character string 518 indicating that the image scanner function (scanner function) and the fax function, that is, the functions that do not involve image forming processing by the image former 16, can be used. When this second error message 510 is displayed in addition to the first error message 500, it is preferable that these first error message 500 and second error message 510 are alternately displayed in a predetermined cycle.

Figure 11:
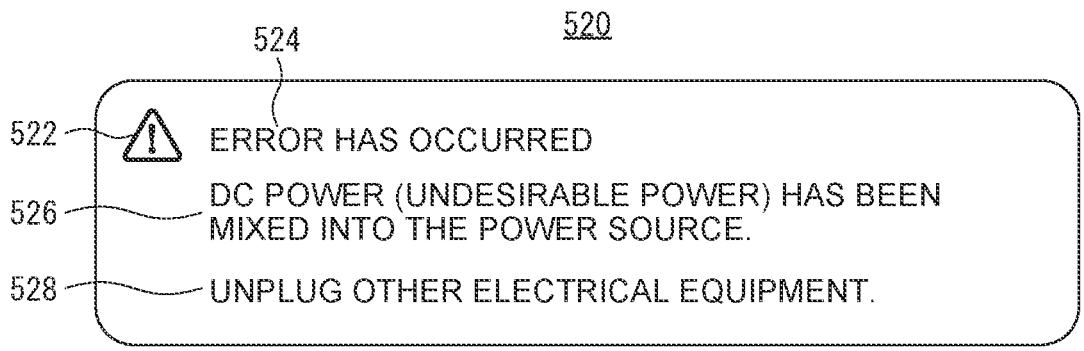
FIG. 11 is a diagram illustrating yet another example of the error message in the first embodiment.

Further, instead of or in addition to the first error message 500 illustrated in FIG. 8, a third error message 520, so to speak, such as that illustrated in FIG. 11, may be displayed. In this third error message 520, a symbol 522 and a character string 524 similar to the symbol 502 and character string 504 in the first error message 500 are included. In addition, in the third error message 520, a character string 526 similar to the character string 506 in the first error message 500 is included. Furthermore, the third error message 520 includes an appropriate character string 528 that urges the user to unplug the other electrical equipment, i.e., to shut off the supply of electric source power to the other electrical equipment. When this third error message 520 is displayed in addition to the first error message 500, it is preferable that these first error message 500 and third error message 520 are alternately displayed in a predetermined cycle. Alternatively, the first error message 500, second error message 510, and third error message 520 may be displayed one at a time in sequence or randomly in a predetermined cycle.

Figure 12:
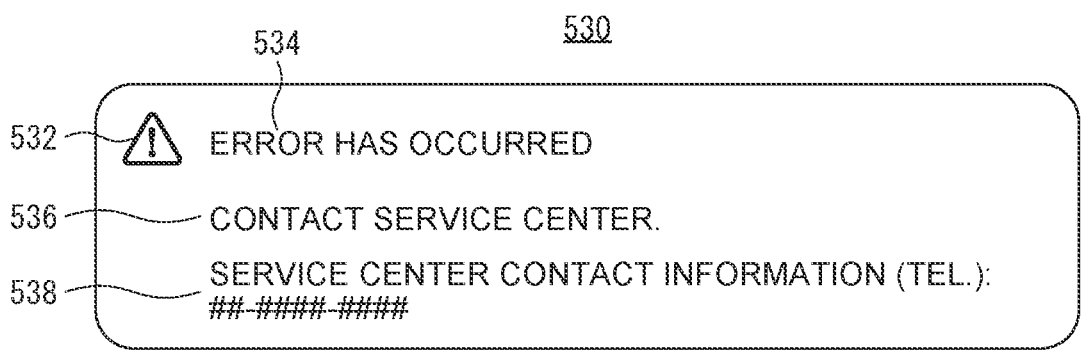
FIG. 12 is a diagram illustrating yet another example of an error message in a second embodiment.

Furthermore, instead of or in addition to the first error message 500 illustrated in FIG. 8, a fourth error message 530, so to speak, such as that illustrated in FIG. 12, may be displayed. In this fourth error message 530, a symbol 532 and a character string 534 similar to the symbol 502 and character string 504 in the first error message 500 are included. In addition, the fourth error message 530 includes an appropriate string 536 that urges the user to contact a service center (not illustrated), and a character string 538 that indicates the contact information (telephone number) of the service center. When this fourth error message 530 is displayed in addition to the first error message 500, it is preferable that these first error message 500 and fourth error message 530 are alternately displayed in a predetermined cycle. Alternatively, the first error message 500, second error message 510, third error message 520, and fourth error message 530 may be displayed one at a time in sequence or randomly in a predetermined cycle.

Figure 13:
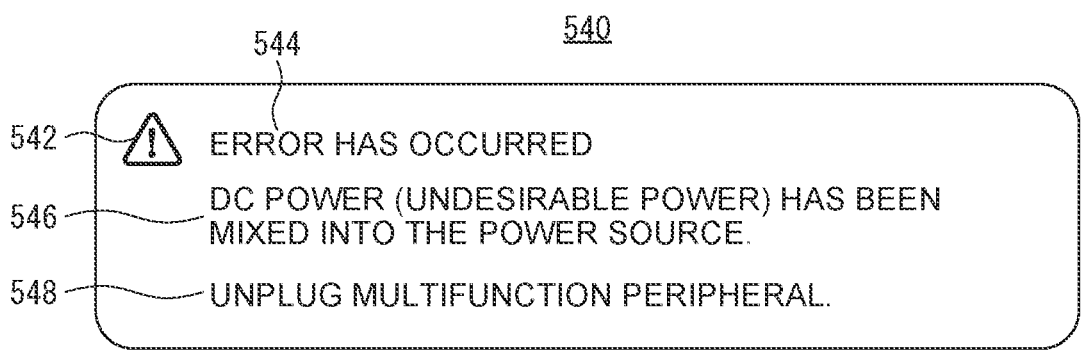
FIG. 13 is a diagram illustrating yet another example of the error message in the second embodiment.

Further, instead of the first error message 500, a fifth error message 540, so to speak, such as that illustrated in FIG. 13, may be displayed. In this fifth error message 540, a symbol 542 and a character string 544 similar to the symbol 502 and character string 504 in the first error message 500 are included. In addition, in the fifth error message 540, a character string 546 similar to the character string 506 in the first error message 500 is included. Furthermore, the fifth error message 540 includes an appropriate character string 548 that urges the user to unplug the multifunction peripheral 10. When the multifunction peripheral 10 is unplugged, it is preferable that the main power switch 100 is turned off prior to the unplugging of the multifunction peripheral 10.

Second Embodiment

Next, a second embodiment of the present disclosure will be described.

Figure 14:
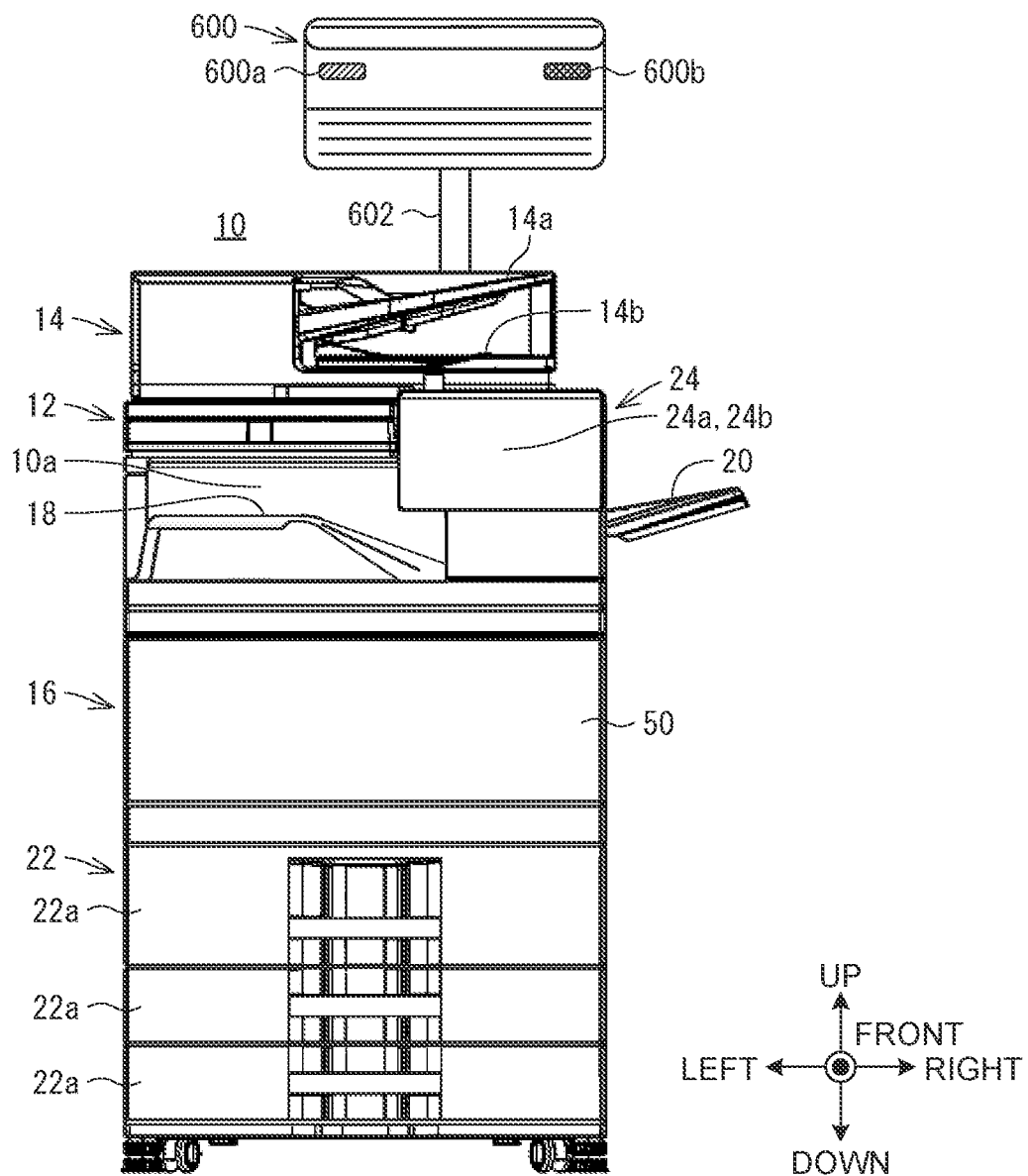
FIG. 14 is a front view of a multifunction peripheral according to the second embodiment of the present disclosure.

The second embodiment is based on the first embodiment. On top of that, in the second embodiment, an ion generator 600 with a status indicator is provided, as illustrated in FIG. 14. This ion generator 600 is mounted on the back of the multifunction peripheral 10 via, for example, a suitable support rod 602. Further, the ion generator 600 has a green LED lamp 600a and a red LED lamp 600b. The green LED lamp 600a is a normal lamp, so to speak, indicating that no abnormality has occurred in the multifunction peripheral 10. Meanwhile, the red LED lamp 600b is a warning lamp, so to speak, indicating that the electric source power of the multifunction peripheral 10 contains DC power. The ion generator 600, for example, is a DC load and operates by receiving a supply of source voltage from the multifunction peripheral 10 (DC conversion circuit 302).

That is, according to the second embodiment, when there is no abnormality in the multifunction peripheral 10, the green LED lamp 600a is lit and the red LED lamp 600b is off. Further, when DC power appears in the electric source power of the multifunction peripheral 10, the green LED lamp 600a turns off and the red LED lamp 600b turns on. Therefore, the user can intuitively recognize that the electric source power of the multifunction peripheral 10 contains DC power when the red LED lamp 600b turns on.

Figure 15:
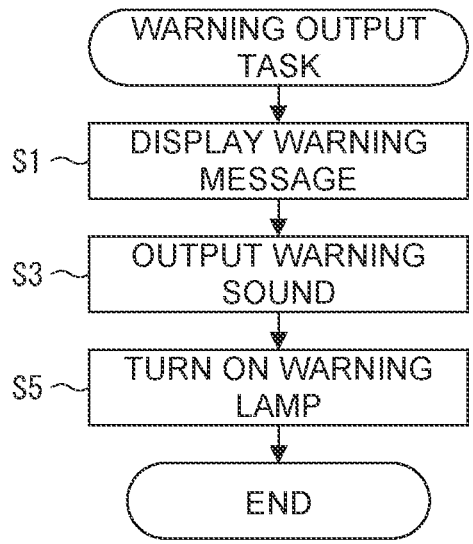
FIG. 15 is a flow diagram illustrating a flow of a warning output task in the second embodiment.

In the second embodiment, the CPU 30a also executes the warning output task. In the warning output task in the second embodiment, as illustrated in FIG. 15, in addition to the warning output task in the first embodiment (see FIG. 9), particularly, step S5 is provided after step S3.

According to the warning output task in this second embodiment, the CPU 30a advances the processing to step S5 after executing step S3. Then, in step S5, the CPU 30a turns on the red LED lamp 600b as a warning lamp. In doing so, the CPU 30a turns off the green LED lamp 600a as a normal lamp. With the execution of this step S5, the CPU 30a ends the warning output task.

Thus, according to the second embodiment, when DC power appears in the electric source power of the multifunction peripheral 10, the red LED lamp 600b as a warning lamp provided outside the multifunction peripheral 10 turns on. The user can intuitively recognize that the electric source power of the multifunction peripheral 10 contains DC power when this red LED lamp 600b turns on. This makes a greater contribution to preventing an abnormal condition where DC power is included in the electric source power from being left unattended.

The lighting of the red LED lamp 600b continues until a predetermined operation is performed to terminate the lighting of the red LED lamp 600b after a restoration work by a serviceman, for example. The lighting of this red LED lamp 600b is an example of the predetermined information according to the present disclosure, and is an example of predetermined information that is output in a visual form, among others. The lighting of this red LED lamp 600b is implemented by the CPU 30a executing step S5 of the warning output task, and the CPU 30a executing the step S5 cooperates with the red LED lamp 600b to constitute an example of the information outputter according to the present disclosure.

In the second embodiment, the ion generator 600 with a status indicator with a red LED lamp 600b is utilized, but the device is not limited to this. For example, a device dedicated to a status display function may be used, or a device dedicated solely to lighting a light-emitter similar to the red LED lamp 600b may be used.

Third Embodiment

Next, a third embodiment of the present disclosure will be described.

The third embodiment is based on, for example, the second embodiment. On top of that, in the third embodiment, when DC power appears in the electric source power of the multifunction peripheral 10, this is notified by e-mail to a pre-registered destination, particularly to the PC. The PC of the registered destination here is, for example, the administrator's PC, but it can be registered arbitrarily, and it is also possible to register multiple destinations.

Figure 16:
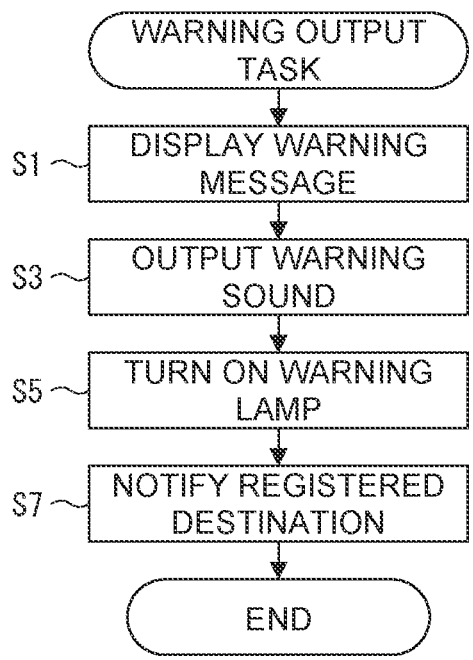
FIG. 16 is a flow diagram illustrating a flow of a warning output task in a third embodiment of the present disclosure.

In the third embodiment, the CPU 30a also executes the warning output task. In the warning output task in the third embodiment, as illustrated in FIG. 16, in addition to the warning output task in the second embodiment (see FIG. 15), particularly, step S7 is provided after step S5.

That is, according to the warning output task in the third embodiment, the CPU 30a advances the processing to step S7 after executing step S5. Then, in step S7, the CPU 30a transmits to the registered destination, an e-mail indicating that the electric source power of the multifunction peripheral 10 contains DC power, that is, the CPU 30a notifies the registered destination by e-mail that the electric source power contains DC power. With the execution of this step S7, the CPU 30a ends the warning output task.

Thus, according to the third embodiment, when DC power appears in the electric source power of the multifunction peripheral 10, this is notified by e-mail to a pre-registered destination. A user who receives this e-mail can recognize that the electric source power of the multifunction peripheral 10 contains DC power, while being at a distance from the multifunction peripheral 10, for example. This also greatly contributes to preventing an abnormal condition where DC power is included in the electric source power from being left unattended.

The e-mail in the third embodiment is an example of the predetermined information according to the present disclosure, and is an example of predetermined information that is output in an electronic form, among others. This e-mail is transmitted to the registered destination via the communicator 34. The transmission of the e-mail is then accomplished by the CPU 30a executing step S7 of the warning output task. The CPU 30a executing this step S7 cooperates with the communicator 34 to constitute an example of the information outputter according to the present disclosure.

The third embodiment is based on the second embodiment, but may be based on the first embodiment. That is, the configuration of the third embodiment may be applied to a configuration where the ion generator 600 with a status indicator is not provided.

Fourth Embodiment

Next, a fourth embodiment of the present disclosure will be described.

The fourth embodiment is based on, for example, the third embodiment. On top of that, in the fourth embodiment, when DC power appears in the electric source power of the multifunction peripheral 10, this is notified to a service center, and particularly, information in an electronic form indicating that the electric source power contains DC power is transmitted to a management server (not illustrated) installed in the service center. The management server will be provided on the Internet, for example.

Figure 17:
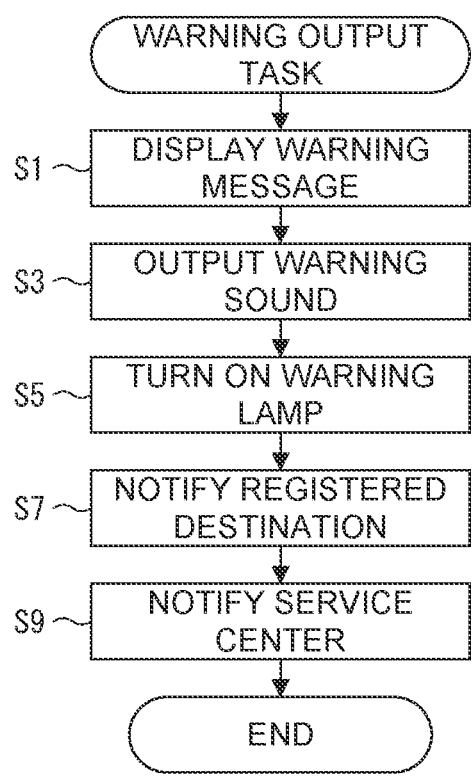
FIG. 17 is a flow diagram illustrating a flow of a warning output task in a fourth embodiment of the present disclosure.

In the fourth embodiment, the CPU 30a also executes the warning output task. In the warning output task in the fourth embodiment, as illustrated in FIG. 17, in addition to the warning output task in the third embodiment (see FIG. 16), particularly, step S9 is provided after step S7.

That is, according to the warning output task in the fourth embodiment, the CPU 30a advances the processing to step S9 after executing step S7. Then, in step S9, the CPU 30a notifies the service center that the electric source power of the multifunction peripheral 10 contains DC power. With the execution of this step S9, the CPU 30a ends the warning output task.

Thus, according to the fourth embodiment, when DC power appears in the electric source power of the multifunction peripheral 10, this is notified to the service center. Therefore, the service center can smoothly provide appropriate support, including the aforementioned restoration work.

The fourth embodiment is based on the third embodiment, but may be based on the first embodiment or second embodiment.

Fifth Embodiment

Next, a fifth embodiment of the present disclosure will be described.

Figure 18:
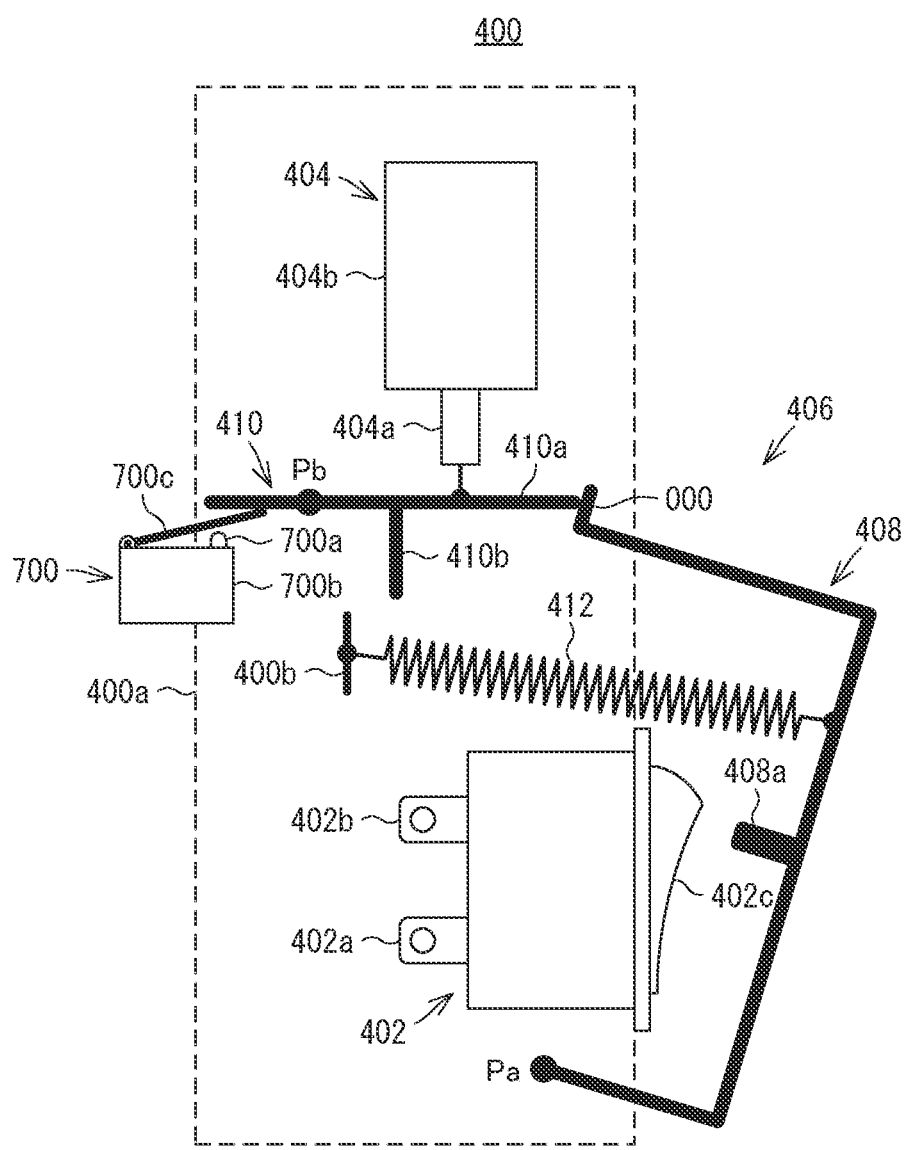
FIG. 18 is a diagram schematically illustrating a configuration of a shutoff mechanism in a fifth embodiment.
Figure 19:
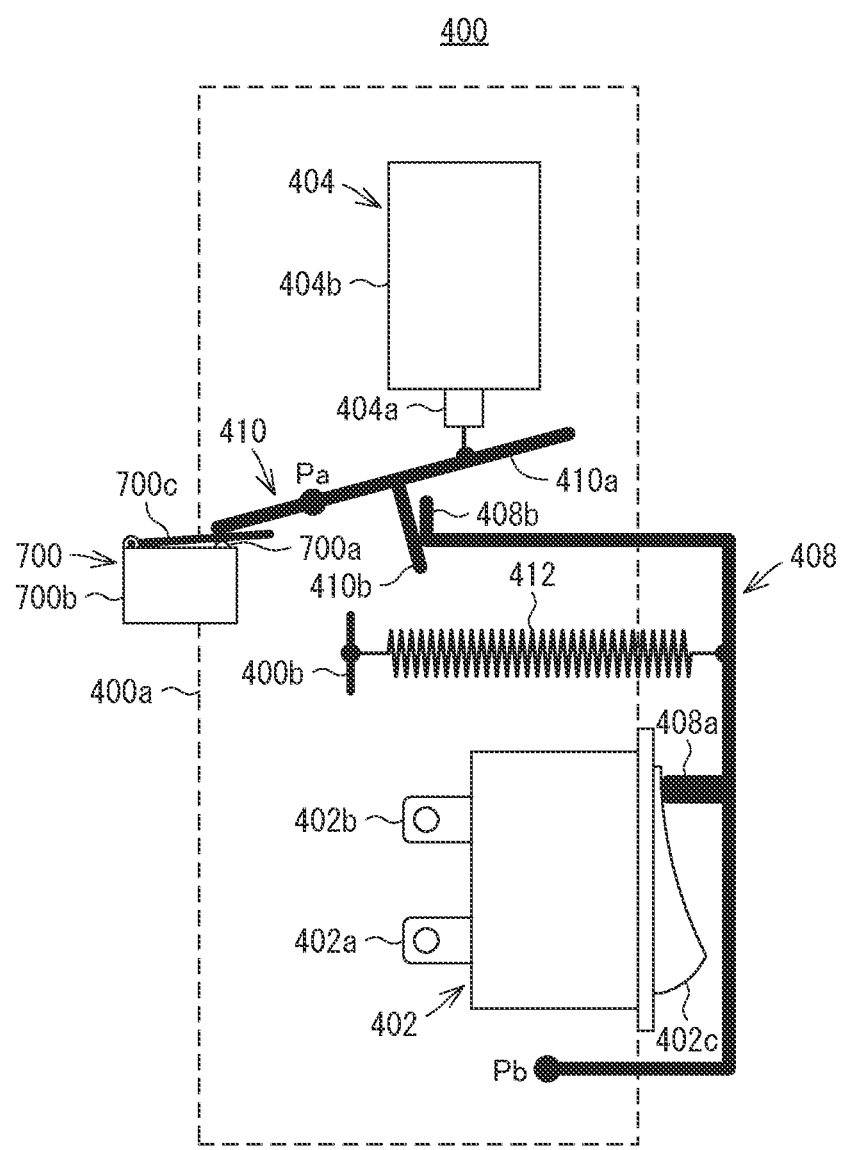
FIG. 19 is a diagram schematically illustrating another state of the shutoff mechanism in the fifth embodiment.

In the fifth embodiment, as illustrated in FIGS. 18 and 19, there is provided a suitable switch, for example a microswitch 700 in the form of a hinge lever, that turns on/off depending on the state of the holding member 410 of the shutoff mechanism 400. The output (contact signal) of the microswitch 700 is then input to the CPU 30a instead of the DC detection signal Sdc.

Specifically, as illustrated in FIG. 18, in normal times, the microswitch 700 is in the OFF state, particularly, with an actuator 700a protruding from a main body 700b. Further, when DC power appears in the electric source power and the holding member 410 rotates about the support point Pb, a lever 700c of the microswitch 700 is pushed down by the holding section 410a of the holding member 410 and the actuator 700a is pushed into the main body 700b. This turns on the microswitch 700. The output of the microswitch 700 is input to the CPU 30a, which executes appropriate processing, including displaying the aforementioned error message 500 on the display 24b and having a warning sound output from the speaker 36a.

The fifth embodiment having such a configuration also exhibits the same actions and effects as those of the first embodiment, for example. This fifth embodiment can be applied to any of the second, third, and fourth embodiments, and thereby will exhibit the same actions and effects as those of the second, third, and fourth embodiments.

OTHER APPLICATION EXAMPLES

Each of the aforementioned embodiments is a specific example of the present disclosure and does not limit the technical scope of the present disclosure. That is, the present disclosure may be applied to aspects other than the present embodiments.

For example, the shutoff mechanism 400 is not limited to the configurations described in each embodiment. That is, as long as the mechanical switch 402 can be turned off when DC power appears in the electric source power, the shutoff mechanism 400 may be implemented with a configuration different from that described in each embodiment.

Further, although the seesaw switch is illustrated as the mechanical switch 402, the switch is not limited to this. That is, switches other than seesaw switches, such as toggle switches, slide switches, and rotary switches, may be employed as the mechanical switch 402.

Moreover, although the DC mixing detection circuit 304 is provided in the power supply circuit 300, the DC mixing detection circuit 304 may be provided in an element other than the power supply circuit 300, such as the controller 30. Furthermore, the DC mixing detection circuit 304 is configured to detect the direction and magnitude of the current component of the electric source power by a current sensor using a Hall element, and to determine whether the electric source power contains DC power on the basis of the detection result by the current sensor. However, the DC mixing detection circuit 304 may be implemented by other configurations. In any case, the DC mixing detection circuit 304 should be configured to accurately and immediately detect whether the electric source power contains DC power.

In addition, the electric source power input to the DC mixing detection circuit 304 is configured to be obtained through the mechanical switch 402, but is not limited to this configuration. That is, the electric source power input to the DC mixing detection circuit 304 may be configured to be obtained without the mechanical switch 402, similarly to the electric source power input to the DC conversion circuit 302.

Furthermore, the solenoid 404 is configured to drive in response to the DC detection signal Sdc input from the DC mixing detection circuit 304, i.e., to use the DC detection signal Sdc as the signal for driving, but is not limited to this. Although a detailed description including illustrations is omitted, for example, a DC voltage Vs as a signal for driving the solenoid 404 may be generated by the DC conversion circuit 302, a suitable switch circuit may be provided to input this DC voltage Vs to the solenoid 404, and this switch circuit may be turned on/off by the DC detection signal Sdc. That is, the switch circuit is in an OFF state in normal times when the electric source power does not contain DC power. Then, when DC power appears in the electric source power, the DC detection signal Sdc is input to the switch circuit, and the switch circuit turns on. Consequently, a DC voltage Vs as a signal for driving the solenoid 404 may be input to the solenoid 404 via the switch circuit, and the solenoid 404 may be driven by receiving the DC voltage Vs.

Furthermore, if the electric source power includes DC power, the power source voltage need not be input to all DC loads. For example, the source voltage may not be input to electrical elements as DC loads that are not required for image forming processing by the image former 16, such as the image former 16 and the paper feeder 22.

Further, in each of the embodiments, the multifunction peripheral 10, which is a type of image forming apparatus, is described as an example, but is not limited thereto. The present disclosure can be applied to image forming apparatuses other than the multifunction peripheral 10, as well as to electrical equipment other than image forming apparatuses.

For example, in electrical equipment such as fan heaters, electric stoves, and microwave ovens, if a heater as a specific element that is heated by receiving an AC power is provided, and an information outputter such as a display and a speaker as operable elements or a communicator is provided, the present disclosure can be applied.

What is claimed is:

1. An electrical equipment that uses alternating current (AC) power as electric source power, the electrical equipment comprising:
    a detector that detects whether the electric source power contains direct current (DC) power,
    a shutter that shuts off, when the electric source power contains the DC power, supply of the electric source power to a specific element that is inconvenient if the electric source power contains the DC power, and
    an information outputter that outputs, when the electric source power contains the DC power, predetermined information indicating that the electric source power contains the DC power, wherein
    direct or indirect supply of the electric source power to some or all of operable elements capable of operating normally is maintained even if the electric source power contains the DC power,
    the information outputter is included in the operable elements to which the direct or indirect supply of the electric source power is maintained, and
    the information outputter outputs a plurality of error messages, as the predetermined information, in a visual form one by one in sequence or randomly in a predetermined cycle.

2. The electrical equipment according to claim 1, wherein the specific element comprises a heater.

3. The electrical equipment according to claim 2, wherein the electrical equipment is an electrophotographic image forming apparatus including a fixing device having the heater.

4. The electrical equipment according to claim 3, further comprising:
    an image reader that reads an image of a document; and
    an image outputter that outputs another image based on the image read by the image reader in an electronic form,
    wherein the image reader and the image outputter are included in the operable elements to which the direct or indirect supply of the electric source power is maintained.

5. The electrical equipment according to claim 1, wherein the information outputter further outputs the predetermined information in an audial form.

6. The electrical equipment according to claim 1, wherein the information outputter further outputs the predetermined information in an electronic form.

7. The electrical equipment according to claim 1, wherein the information outputter further outputs respective ones of the plurality of error messages in a popped-up manner.

8. The electrical equipment according to claim 1, wherein the information outputter further outputs the predetermined information in the visual form by lighting a lamp provided on an external equipment as a warning lamp.

* * * * *